(12) United States Patent
Wang et al.

(10) Patent No.: US 10,795,025 B2
(45) Date of Patent: Oct. 6, 2020

(54) UN-DIFFERENTIAL CORRECTION DISTRIBUTED PROCESSING SYSTEM AND METHOD BASED ON RECEIVER OF REFERENCE STATION

(71) Applicant: COMNAV TECHNOLOGY LTD., Shanghai (CN)

(72) Inventors: Yongquan Wang, Shanghai (CN); Maorong Ge, Shanghai (CN); Yong Zhang, Shanghai (CN); Xingxing Li, Shanghai (CN); Ruopu Liu, Shanghai (CN); Yang Gao, Shanghai (CN); Liang Xu, Shanghai (CN); Qing Yin, Shanghai (CN)

(73) Assignee: COMNAV TECHNOLOGY LTD., Shanghai (CN)

( * ) Notice: Subject to any disclaimer, the term of this patent is extended or adjusted under 35 U.S.C. 154(b) by 363 days.

(21) Appl. No.: 15/745,746

(22) PCT Filed: Jun. 30, 2016

(86) PCT No.: PCT/CN2016/087953
§ 371 (c)(1),
(2) Date: Jan. 18, 2018

(87) PCT Pub. No.: WO2017/012456
PCT Pub. Date: Jan. 26, 2017

(65) Prior Publication Data
US 2018/0210089 A1     Jul. 26, 2018

(30) Foreign Application Priority Data

Jul. 21, 2015   (CN) .......................... 2015 1 0430018

(51) Int. Cl.
*G01S 19/07*    (2010.01)
*G01S 19/04*    (2010.01)

(52) U.S. Cl.
CPC ............ *G01S 19/073* (2019.08); *G01S 19/04* (2013.01)

(58) Field of Classification Search
CPC .......... G01S 19/04; G01S 19/07; G01S 19/40; G01S 19/073
See application file for complete search history.

(56) References Cited

U.S. PATENT DOCUMENTS

| 8,847,820 B2 | 9/2014 | Landau et al. | |
|---|---|---|---|
| 2001/0002822 A1* | 6/2001 | Watters | G01S 19/07 342/357.64 |
| 2010/0079333 A1* | 4/2010 | Janky | G01S 19/07 342/357.24 |

FOREIGN PATENT DOCUMENTS

| CN | 102576077 A | 7/2012 |
|---|---|---|
| CN | 103176188 A | 6/2013 |

(Continued)

OTHER PUBLICATIONS

M. Moeglein, An Introduction to SnapTrack® Wireless-Assisted GPS Technology™, GPS Solutions, vol. 4(3), p. 16-26, 2001 (Year: 2001).*

(Continued)

*Primary Examiner* — Bernarr E Gregory
*Assistant Examiner* — Fred H Mull
(74) *Attorney, Agent, or Firm* — Morgan, Lewis & Bockius LLP

(57) ABSTRACT

Un-differential correction distributed processing system and method based on a receiver of a reference station, in which main calculation tasks of conventional centralized data processing are transferred to the receiver of the reference station. The receiver of the reference station executes tasks of the PPP calculation, the PPP un-differential ambiguity fixing and the un-differential correction product generating via data interaction with servers. The client generates a (Continued)

relevant virtual un-differential correction by visiting a reference station area code address server and achieves PPP-RTK calculation under area augmentation. Load of server is greatly reduced, and problem of overload on relevant servers is solved; meanwhile, there is no need for the client to arrange a machine room of servers that needs specially-assigned person on duty, thus reducing user's maintenance work on the servers and saving costs. The reference station and client are not required to upload geographic coordinates precisely, and confidentiality is better.

10 Claims, 3 Drawing Sheets

(56) References Cited

FOREIGN PATENT DOCUMENTS

| CN | 104133235 A | 11/2014 |
|---|---|---|
| CN | 105068096 A | 11/2015 |
| WO | 2014/065664 A1 | 5/2014 |

OTHER PUBLICATIONS

P. Fang et al., IGS Near Real-Time Products and Their Applications, GPS Solutions, vol. 4(4), p. 2-8, 2001 (Year: 2001).*

Welcome to the Products.IGS-IP.Net Ntrip Broadcaster, https://products.igs-ip.net/home, Apr. 2011 (Year: 2011).*

X. Zou et al., URTK: undifferenced network RTK positioning, GPS Solut, vol. 17, p. 283-293, 2013 (Year: 2013).*

Zheng Yanli, Research on Integer Ambiguity Resolution in GPS Precise Point Positioning, GNSS Research Center, Wuhan University, May 2013 (Year: 2013).*

X. Zou et al., Instantaneous Ambiguity Resolution for PPP-RTK Using Regional Ground-Based Augmentation Information, Journal of Geodesy and Geodynamics, vol. 34(1), p. 78-83, Feb. 2014 (Year: 2014).*

English Translation of X. Zou et al., Instantaneous Ambiguity Resolution for PPP-RTK Using Regional Ground-Based Augmentation Information (Year: 2020).*

English Translation of p. 2-5 and 35-47 of Zheng Yanli, Research on Integer Ambiguity Resolution in GPS Precise Point Positioning (Year: 2020).*

English Abstract for Zheng, "Research on Integer Ambiguity Resolution in GPS Precise Point Positioning", Wuhan University, China Doctoral Dissertations Full-Text Database (Basic Sciences), No. 09, Sep. 15, 2013, pp. 3, 35-39, and 44-45.

Ge et al., "Resolution of GPS carver-phase ambiguities in Precise Point Positioning (PPP) with daily observations", Journal of Geodesy, vol. 82, No. 7, Jul. 31, 2008, pp. 389-399.

International Search Report dated Sep. 29, 2016, for International Application No. PCT/CN2016/087953.

Teunissen, "The least-squares ambiguity decorrelation adjustment: a method for fast GPS integer ambiguity estimation", Journal of Geodesy, vol. 70, 1-2, Nov. 1995, pp. 65-82.

\* cited by examiner

UN-DIFFERENTIAL CORRECTION DISTRIBUTED PROCESSING SYSTEM AND METHOD BASED ON RECEIVER OF REFERENCE STATION

CROSS-REFERENCE TO RELATED APPLICATION

This application claims priority from Chinese patent application No. 201510430018.X, filed on Jul. 21, 2015, the entirety of which is hereby incorporated by reference herein and forms a part of the specification.

BACKGROUND OF THE INVENTION

Field of the Invention

The invention relates to the technical field of global satellite navigation and positioning, and more particularly, to an un-differential correction distributed processing system and method based on a receiver of reference station.

Description of the Related Art

With rapid development of global satellite navigation technology, fast real-time precise positioning technology is becoming more widely used in monitoring landslide and earthquake, in precision agriculture, and in precise navigation and positioning of vehicles, ships and airplanes or the like, and the number of users is exponentially growing. However, in practice, it is difficult to meet requirements of increasing users.

BRIEF SUMMARY OF THE INVENTION

According to an aspect of the present invention, there is provided an un-differential correction distributed processing system based on a receiver of reference station of GNSS, comprising:

a precise orbit clock offset server configured to provide a precise ephemeris for an area reference station;

a reference station area code address server configured to match a client end to the nearest reference stations forming a triangle; and a phase fraction estimating server configured to calculate a phase fraction part and send the phase fraction part to the area reference station.

According to another aspect of the present invention, there is provided an un-differential correction distributed processing method based on a receiver of reference station of GNSS, comprising: performing un-differential real ambiguity resolution, un-differential ambiguity fixing and data interaction with a client end by the receiver of reference station so as to relief load for a server, wherein, the method further comprises:

(41) performing information interaction between a precise orbit clock offset server and an area reference station, and sending a real-time precise ephemeris to the area reference station by the precise orbit clock offset server;

(42) performing information interaction between a phase fraction estimating server and the area reference station, sending a calculated un-differential real ambiguity back to the phase fraction estimating server by the area reference station, calculating a phase fraction part by the phase fraction estimating server, and sending the phase fraction part to the area reference station;

(43) performing information interaction between a reference station area code address server and the client end, visiting the reference station area code address server by the client end so as to obtain a reference station area code address list to match the nearest reference stations forming a triangle; and

(44) performing information interaction between the area reference station and the client end, connecting the client end to the nearest reference stations forming a triangle so as to obtain a real-time precise orbit, a clock offset and an un-differential correction, and performing PPP-RTK calculation.

According to another aspect of the present invention, there is provided a real-time un-differential correction generating system, comprising: a precise orbit clock offset server, a phase fraction estimating server and a plurality of area reference stations, wherein the precise orbit clock offset server provides a precise ephemeris to each of the area reference stations;

wherein the phase fraction estimating server calculates a phase fraction part of a satellite according to an un-differential real ambiguity; and wherein each of the area reference stations calculates the un-differential real ambiguity according to its own observation data, and calculates a real-time un-differential correction according to the precise ephemeris and the phase fraction part.

These and other features, aspects and advantages of the present invention will become better understood with regard to the following description, appended claims, and accompanying drawings.

DETAILED DESCRIPTION OF THE EMBODIMENTS

Figure 1:
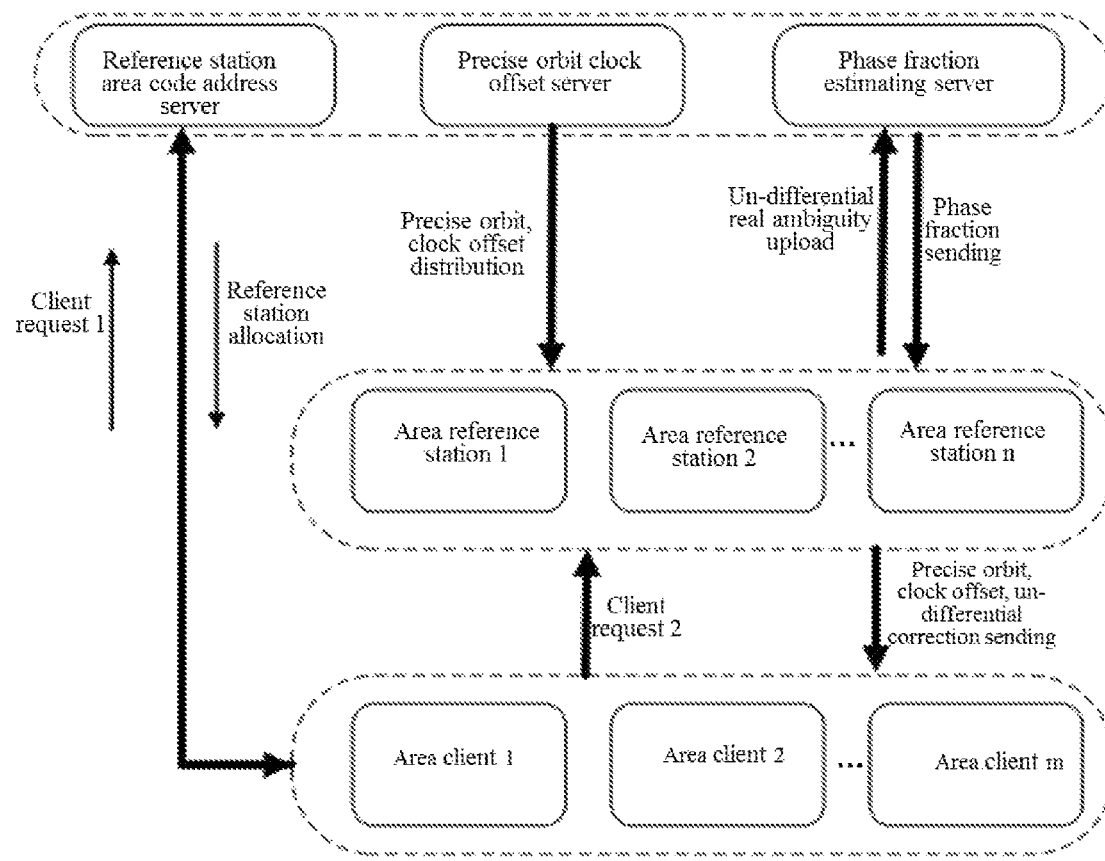
FIG. 1 is a block diagram showing an un-differential correction distributed processing system based on a receiver of a reference station of the invention.
Figure 2:
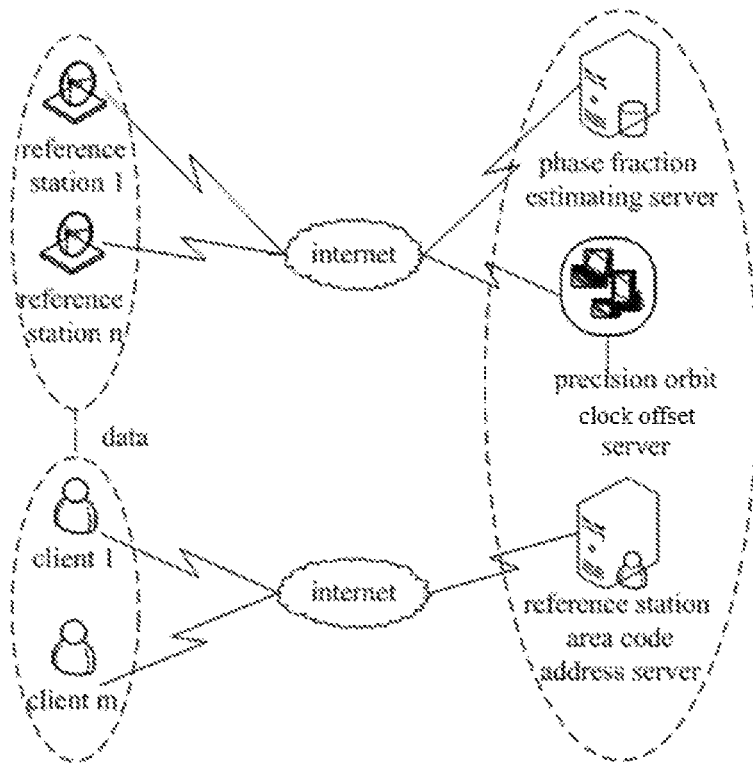
FIG. 2 is a view showing data transmission interaction of un-differential correction distributed processing based on a receiver of a reference station of the invention.
Figure 3:
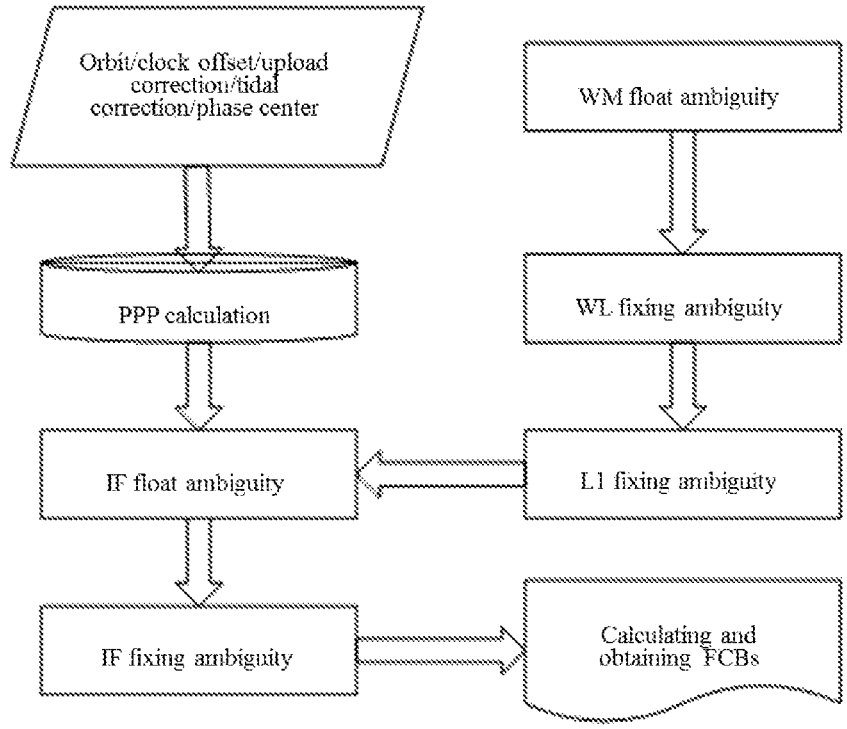
FIG. 3 is a flow chart showing the steps of obtaining a real-time un-differential correction of each satellite by a reference station according to the invention.

Accordingly, how to alleviate the communication burden of a server and how to provide fast real-time precise positioning service for different types of more users based on existing capacity of real-time data communication service become problems that need to be addressed.

In the application of precise positioning of a global navigation satellite system (GNSS) based on a continuously operating reference station (CORS), the real-time precise point positioning (RTPPP) is currently one of the most rapidly developing technologies. The RTPPP method is based on un-differential observation value of one single GNSS receiver, and achieves a high precision positioning in a wide area and even global area with no need for support from high-density reference network. However, in the RTPPP method based on a real number solution, it usually takes more than several hours of observation to achieve a positioning precision of the level of millimeter (mm)~centimeter (cm), and the positioning precision and reliability are lower than double-differential ambiguity fixed solution, thus restricting a more widespread application of the RTPPP method in engineering areas to some extent. Therefore, the focus of international research on the RTPPP is shifted from the un-differential ambiguity real number solution to the integer fixed solution which is a precise point positioning-real time kinematic (PPP-RTK) technology. Currently, precise point positioning (PPP) and network real-time kinematic (NRTK) positioning are two representative technologies of the GNSS positioning.

In the existing PPP-RTK method, in order to fix about 90% of the ambiguity, at least ten minutes are required for the user to perform initialization. Consequently, un-differential network RTK method is developed for the purpose of achieving a uniform RTPPP service in both a wide-area and a local area in an un-differential data processing mode. The un-differential network RTK method makes full use of the characteristic of fast carrier phase ambiguity fixing in the existing double-differential mode network RTK method, and a converging rate of the RTPPP can be considerably improved in the un-differential network RTK method. However, the current commonly used method requires a data acquisition interaction between the user and a load calculating server so as to achieve PPP-RTK calculation, and in such a situation, the load calculating server needs to obtain area augmentation information of nearby reference stations in real time. Since a valid period of the area augmentation information is typically less than six seconds, the real-time data communication burden on the load calculating server and the reference stations is undoubtedly heavy, and the number of users that can be served simultaneously by the entire area augmentation system is limited. Moreover, the reference stations are connected to the load calculating server in a several-for-one way. Thus, the acquisition of data from reference stations is greatly restricted, and the reference stations can only provide data to a limited number of users according to a concurrency number of the load calculating servers.

Furthermore, since conventional load calculating servers require the reference stations and client end to precisely upload geographic coordinates, a leakage risk of user's key information is undoubtedly increased. Therefore, how to provide a safe and reliable processing system and method that can relief load of load calculating server and realize load equalization while simultaneously providing rapid real-time precise positioning service for massive users has become a problem that needs to be addressed urgently.

As shown in FIG. 1, the un-differential correction distributed processing system based on a receiver of reference station of the invention comprises:

a precise orbit clock offset server, a reference station area code address server, a phase fraction estimating server, an area reference station, and a client end.

The precise orbit clock offset server provides a precise ephemeris to the area reference station.

The precise orbit clock offset server is one of a precise orbit clock offset distributor, a server configured by the user himself for estimating a precise orbit and clock offset data, or a server existing both at home and abroad that can a precise orbit and clock offset data.

wherein the data of the precise orbit clock offset distributor originates from the server configured by the user himself for estimating a precise orbit and clock offset data, or the server existing both at home and abroad that can a precise orbit and clock offset data.

The reference station area code address server provides a reference station area code address list to each area client end.

The phase fraction estimating server is used for calculating a phase fraction part and sending the phase fraction part to the area reference station.

With reference to FIGS. 1 to 5, an un-differential correction distributed processing method based on a receiver of reference station includes the following four data acquisition interactive processing processes:

(I) Information interaction can be performed between the precise orbit clock offset server and the area reference station, and the precise orbit clock offset server sends a real-time precise ephemeris to the area reference station;

(II) Information interaction can be performed between the phase fraction estimating server and the area reference station, and the area reference station calculates an un-differential real ambiguity according to its own observation data and sends the calculated un-differential real ambiguity to the phase fraction estimating server. The phase fraction estimating server collects the un-differential real ambiguity uploaded by each of the reference stations, executes synchronous processing and validity determination of the un-differential real ambiguity, and calculates the phase fraction part of each of the satellites in connection with the precise ephemeris according to relevant parameter estimation criteria. The receiver of each reference station obtains the above phase fraction part of the satellite, and executes the PPP un-differential ambiguity fixing calculation in connection with the real-time precise ephemeris. When the validity check is successfully passed, a real-time un-differential correction of each of the satellites can be extracted and formed, and is stored in the cache of receiver for business invoking by users.

Figure 5:
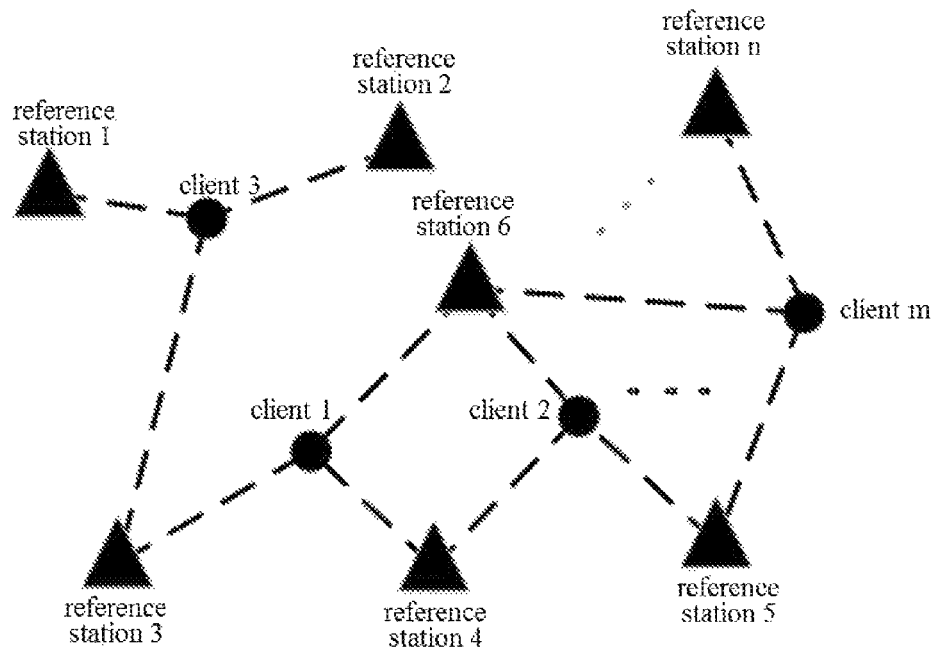
FIG. 5 is a schematic diagram showing matching a client end to the nearest individual reference stations forming a triangle area according to the invention.

(III) Information interaction can be performed between the reference station area code address server and the client end, and the user visits the reference station area code address server by the user so as to obtain a reference station area code address list to match the nearest reference stations that form a triangle, as shown in FIG. 5.

(IV) Information interaction can be performed between the area reference station and the client end. The client refreshes the reference station area code address list. Via a two level positioning determination of an approximate position of the location and based on the Delaunay triangulation algorithm (for details of the algorithm, please refer to the point by point insertion Lawson method proposed by Lawson in 1977) networking, the nearest reference stations forming a triangle are matched so as to augment information service parameters, such as connection IP ports and the validity of un-differential correction, etc. When the above business request verification is passed, after the real-time un-differential correction of relevant stations sites (the nearest reference stations forming a triangle) are acquired based on TCP/IP protocol connection, a linear interpolation is then executed according to information such as station coordinate and client coordinate or the like so as to generate relevant virtual un-differential correction information. Then, the PPP-RTK positioning calculation is executed in connection with the real-time precise ephemeris so as to obtain a centimeter level positioning result in real time.

The information interaction between the phase fraction estimating server and the area reference station specifically includes the following steps:

(42.1) calculating the un-differential real ambiguity by some or all of the area reference stations according to observation data of the area reference stations themselves, and sending the un-differential real ambiguity to the phase fraction estimating server;

(42.2) obtaining the phase fraction part of each satellite by the phase fraction estimating server according to the un-differential real ambiguity, and sending the phase fraction parts to receivers of all of the area reference stations;

(42.3) performing PPP un-differential ambiguity fixing calculation independently in the receivers of the area reference stations according to the phase fraction parts;

(42.4) calculating a real-time un-differential correction of each satellite in the receiver of the area reference station after a PPP un-differential ambiguity of the area reference station is fixed; and (42.5) storing the real-time un-differential correction of each satellite in a cache of the receiver of the area reference station by the area reference station.

Information interaction can be performed between the area reference station and the client end, which specifically includes the following steps:

(44.1) visiting the reference station area code address server by the client end so as to obtain the reference station area code address list to match the nearest reference stations that form a triangle;

(44.2) connecting the area client end to the nearest reference stations that form a triangle and obtaining the real-time un-differential correction stored in the cache of the receiver of the nearest reference stations that form a triangle;

(44.3) generating a virtual un-differential correction by the client end according to the real-time precise orbit, the clock offset and the un-differential correction obtained from the nearest reference stations that form a triangle; and (44.4) executing the PPP-RTK positioning calculation by the client end according to the virtual un-differential correction and the real-time precise ephemeris sent by the precise orbit clock offset server so as to achieve centimeter level precise positioning in real time.

In a preferred embodiment, the step 42.2 further specifically includes the following steps:

(42.2.1): eliminating the influences of measurement noise and multi-path of the un-differential real ambiguity by the phase fraction estimating server so as to determine whether the un-differential real ambiguity is valid;

(42.2.2): removing the un-differential real ambiguity if the un-differential real ambiguity is invalid; and (42.2.3): obtaining the phase fraction part of a satellite corresponding to the un-differential real ambiguity via an inter-satellite single-difference method, if the un-differential real ambiguity is valid. Specifically:

it is determined that whether the uploaded un-differential real ambiguity is valid, and a multi-epoch smoothing is executed on the un-differential real ambiguity so as to eliminate the influences of measurement noise and multi-path. The smoothed ambiguity $\overline{N}^i$, and the measurement noise $\sigma_i^2$ are represented in following formulas.

$$\overline{N}^i = \overline{N}^{i-1} + \frac{1}{i}(N^i - \overline{N}^{i-1}) \quad (1)$$

$$\sigma_i^2 = \sigma_{i-1}^2 + \frac{1}{i}\left[(N^i - \overline{N}^{i-1})^2 - \sigma_{i-1}^2\right]$$

If the absolute value $|N^{i+1} - \overline{N}^i|$ of the difference between the real ambiguity $N^{i+1}$ of the $(i+1)^{th}$ epoch and $\overline{N}^i$ satisfies the following formula:

$$|N^{i+1} - \overline{N}^i| < 4\sigma_i \quad (2)$$

then, it is determined that the real ambiguity of the $(i+1)^{th}$ epoch does not have a cycle slip or gross error, and can be used directly. If the formula (2) is not satisfied, it means that a cycle slip or gross error exists in the $(i+1)^{th}$ epoch. Then, the absolute value $|N^{i+2} - \overline{N}^i|$ of the difference between the real ambiguity $N^{i+2}$ of the $(i+2)^{th}$ epoch and $\overline{N}^i$ is determined. If the absolute value $|N^{i+2} - \overline{N}^i|$ is larger than or equal to "$4\sigma_i$" and has a good compliance with $N^{i+1}$, it means that a cycle slip occurs in the $(i+1)^{th}$ epoch, and it is required to process the first "i" epochs and the epochs beginning from the $(i+1)^{th}$ epoch segment-wise. If $N^{i+2}$ has a good compliance with $\overline{N}^i$ and the absolute value $|N^{i+2} - N^{i+1}|$ is larger than or equal to "$4\sigma_i$", it means that gross error exists in the $(i+1)^{th}$ epoch, and it is required to remove the real ambiguity of this epoch.

In a preferred embodiment, the step 42.3 further includes the following steps:

(42.3.1) obtaining the phase fraction part and the real-time precise ephemeris by the area reference station and fixing the un-differential real ambiguity independently at the receiver of the reference stations according to the phase fraction part and the real-time precise ephemeris;

(42.3.2) determining whether the satellite satisfies the validity requirement by the area reference station;

(42.3.3) calculating the real-time un-differential correction of each satellite and storing the real-time un-differential correction in the receiver of the area reference station, if the satellite satisfies the validity requirement; and (42.3.4) ignoring the satellite if the satellite does not satisfy the validity requirement. Specifically:

in order to obtain a valid PPP fixing solution, an initial phase deviation and a satellite clock hardware delay of the above receiver can be estimated and eliminated through an inter-satellite single-difference method, i.e., an uncalibrated hardware phase delay of the receiver is eliminated via an inter-satellite single-difference combination. The ionospheric delay can be eliminated via the ionosphere-free combination observed values. However, the ionosphere-free combination ambiguity loses the integer property. Thus, the ionosphere-free combination ambiguity $\Delta N_{LC}^{i,j}$ is required to be divided into a combination of wide-lane ambiguity and a narrow-lane ambiguity, as shown in the following formula.

$$\Delta N_{LC}^{i,j} = \qquad (3)$$

$$\frac{f_1^2}{f_1^2 - f_2^2}\Delta N_1^{i,j} + \frac{f_1 f_2}{f_1^2 - f_2^2}\Delta N_2^{i,j} = \frac{f_1}{f_1 + f_2}\Delta N_1^{i,j} + \frac{f_1 f_2}{f_1^2 - f_2^2}\Delta N_w^{i,j}$$

The superscript (i,j) in the formula (3) represents the inter-satellite single difference, and $\Delta N_w^{i,j}$ represents the wide-lane ambiguity of the inter-satellite single difference. Since $$\frac{f_1}{f_1 + f_2}$$

represents a wavelength of the narrow-lane ambiguity, $\Delta N_1^{i,j}$ represents the narrow-lane ambiguity of the inter-satellite single difference.

Both of the wide-lane ambiguity and the narrow-lane ambiguity in the formula (3) include the fraction part FCB of the uncalibrated hardware phase delay of the satellite, and thus $\Delta N_{LC}^{i,j}$ can be also represented in the following formula.

$$\Delta N_{LC}^{i,j} = \frac{f_1}{f_1+f_2}(\Delta n_1^{i,j} + \Delta FCB_1^{i,j}) + \frac{f_1 f_2}{f_1^2 - f_2^2}(\Delta n_w^{i,j} + \Delta FCB_w^{i,j}) \quad (4)$$

In the formula (4), $\Delta n_w^{i,j}$ represents the integer part of the wide-lane ambiguity, and $\Delta n_1^{i,j}$ represents the integer part of the narrow-lane ambiguity (including the influence of the integer part of hardware delay). $\Delta FCB_w^{i,j}$ represents the single difference wide-lane phase fraction, and $\Delta FCB_1^{i,j}$ represents the single difference narrow-lane phase fraction.

The real number solution of the multi-epoch smoothed value $\hat{N}_w^{i,j}$ is calculated via a combination of Wübbena and Melbourne (WM) observations, and the measurement noise and the multi-path effects are reduced via the multi-epoch smoothed value $\hat{N}_w^{i,j}$. Then, $\Delta FCB_w^{i,j}$ is estimated using a corresponding method, such as the cosine function method.

When $\Delta FCB_w^{i,j}$ is determined, it is brought into the ionosphere-free combination observed values. The single difference narrow-lane phase fraction $\Delta FCB_1^{i,j}$ is calculated in a similar step, as shown specifically in FIG. 3.

In order to uniform the data reference, a reference condition that the fraction part FCB of a satellite is zero is introduced to convert the single difference phase fraction $\Delta FCB^{i,j}$ into an un-differential phase fraction $FCB^i$. Consequently, it is not required for the client end to consider whether the satellite is consistent with a reference station network reference satellite.

Moreover, the fixing method of the PPP un-differential ambiguity includes the following steps.

When the receiver of the reference station receives the wide-lane phase fraction and the narrow-lane phase fraction, the corresponding real number ambiguities are corrected respectively, and the integer characteristics of the wide-lane ambiguity and the narrow-lane ambiguity are restored. The Lambda searching algorithm is typically used in positioning so as to search and fix the ambiguity, and for specific steps of the algorithm, one can refer to the reference document "TEUNISSEN, P. J. G. The least-squares ambiguity decorrelation adjustment: a method for fast GPS integer ambiguity estimation [J]. Journal of Geodesy. 1995(2):65-28.". After the wide-lane ambiguity and the narrow-lane ambiguity are fixed, the ionosphere-free combination ambiguity is represented by a combination of wide-lane integer ambiguity and narrow-lane integer ambiguity, and a fixed solution of the PPP ambiguity is obtained.

The determination of whether a satellite is valid typically includes three steps:

The first step: when fixing the wide-lane ambiguity and the narrow-lane ambiguity, the Lambda algorithm is often used for searching, and in the searching process, a ratio factor Ratio1 is determined in the following formula:

$$\text{Ratio1} = \frac{\min_{s\,min}}{\min_{min}} \geq 2 \quad (5)$$

In the formula (5), the parameter "$\min_{min}$" represents a minimum variance in the Lambda algorithm, and the parameter "$\min_{s\,min}$" represents the second minimum variance.

The second step: Two groups of optimal and sub-optimal ambiguities of the fixed wide-lane ambiguity $n_w$ and narrow-lane ambiguity $n_1$ are combined to form optimal and sub-optimal fixed ambiguity $N_{LC}$, and the fixed ambiguity $N_{LC}$ is brought into the ionosphere-free combination equation (3) to determine a ratio factor Ratio2 in the following formula:

$$\text{Ratio2} = \frac{\sigma_{0\,s\,min}^2}{\sigma_{0\,min}^2} \geq 3 \quad (6)$$

In the formula (6), $\sigma_{0\,min}^2$ represents a posterior unit weight error which is obtained by calculating parameters after the fixed ambiguity $N_{LC}$ is brought into the ionosphere-free combination equation (3).

The third step: after the above two verification steps, an observation residual $V_i$ of each of the satellites is calculated using the group of ambiguities corresponding to $\sigma_{0\,min}^2$, and the observation residual $V_i$ is determined in the following formula:

$$V_i \leq 3\delta \quad (7)$$

In the formula (7), "$\delta$" represents the nominal accuracy of the corresponding combined or non-combined observation.

If the observation residual $V_i$ of a satellite satisfies the formula (7) in the third step, the un-differential correction corresponding to the satellite is calculated, and if not, the satellite is ignored.

When the fixed solutions of the wide-lane ambiguity and the narrow-lane ambiguity are obtained, the fixed solution of the un-differential ambiguity at the frequency bands "L1" and "L2" can be recovered, and calculation of the un-differential correction of the observations can be achieved.

The number of the reference stations in each area is no less than three. Each of the reference stations calculates its own real ambiguity independently, and uploads the real ambiguity to the phase fraction estimating server in real time. The phase fraction estimating server collects the un-differential real number ambiguities of multiple reference stations to estimate the phase fraction FCB. When each of the reference stations obtains the phase fraction FCB from the phase fraction estimating server, the precise orbit of the satellite and the clock offset, PPPAR of the fixed ambiguity is executed independently and the un-differential correction is generated. The user is matched to the nearest reference stations forming a triangle via the two level positioning and the triangulation algorithm so as to obtain augmentation information for PPP. Thus, each of the users is only related to the nearest reference stations forming a triangle.

Figure 4:
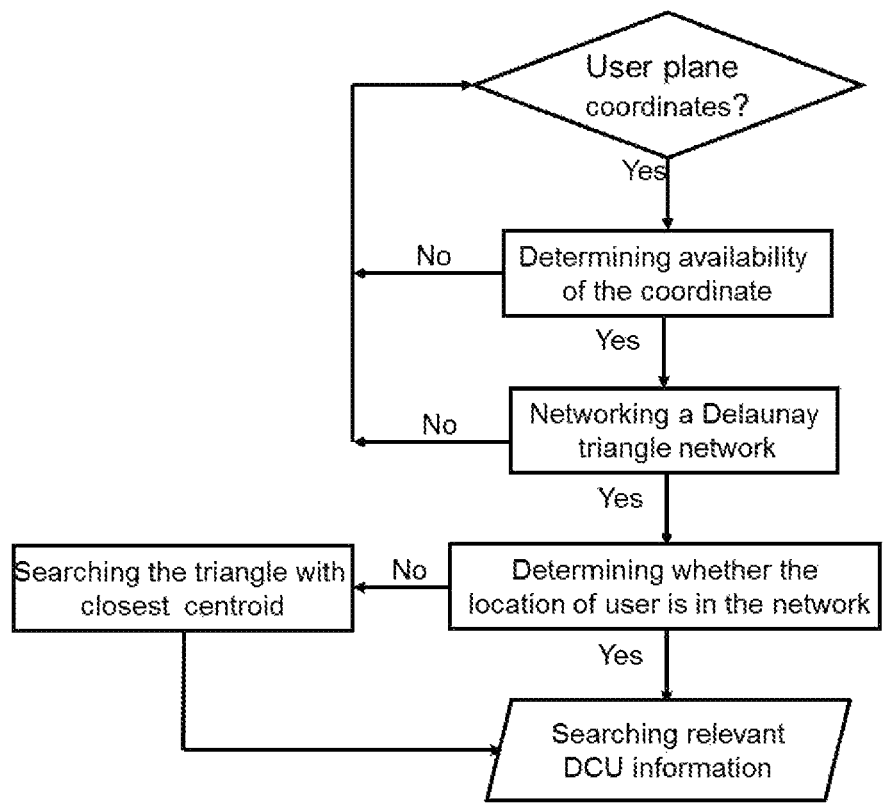
FIG. 4 is a flow chart showing the steps of matching a client end to the nearest individual reference stations forming a triangle area according to the invention.

As shown in FIG. 4 and FIG. 5, in a preferred embodiment, the step 44.1 specifically further includes the following steps.

(44.1.1) obtaining approximate position information of the user by the area client end;

(44.1.2) determining whether the client end is in a triangle area formed by any three area reference stations by the client end according to triangulation algorithm;

(44.1.3) obtaining augmentation information service parameters stored separately in the receivers of the three area reference stations by the client end, if the client end is in the triangle area formed by the any three area reference stations; and (44.1.4) searching for a triangle which has the shortest distance from the center of the client end, if the client end is not in the triangle area formed by the any three reference stations, and then executing the step of (44.1.3) again.

In a preferred embodiment, the step (44.3) specifically includes:

the area client end performs linear interpolation on the real-time un-differential correction so as to generate a virtual un-differential correction.

Since the generated un-differential atmospheric delay is related to the clock offset and the ambiguity, the real atmospheric delay amount can not be reflected completely. However, the internal uniformity is enough to eliminate the effects of error and restore the integer characteristic of the ambiguity.

Firstly, an interpolation coefficient is estimated according to an interpolation model, and the interpolation atmospheric delay correction is calculated according to the interpolation coefficient.

The un-differential correction of the client end is estimated according to the interpolation coefficient in the following formula:

$$\hat{v}_u = \sum_{i=1}^{n} \alpha_i \hat{v}_i \tag{8}$$

The subscript "u" represents the serial number of the client end, the subscript "i" represents the serial number of the reference station, and "n" represents the number of the reference stations. The parameter $\hat{v}_i$ represents an un-differential ionospheric delay correction or an un-differential tropospheric delay correction. The parameter $\hat{v}_u$ represents an interpolation ionospheric delay correction or an interpolation tropospheric delay correction of the client end.

In a preferred embodiment, the step 44.4 specifically includes the following steps:

The ionosphere-free combination observed values are typically used in the PPP, as shown in the following formulas.

$$P_{IF} = \rho_0 + \delta\rho + c \cdot (dt - dT) + T + dm + \varepsilon_P \tag{9}$$
$$L_{IF} = \rho_0 + \delta\rho + c \cdot (dt - dT) + T + B_{IF} + \delta m + \varepsilon_L$$
$$P_{IF} = \frac{f_1^2}{f_1^2 - f_2^2} P_1 - \frac{f_2^2}{f_1^2 - f_2^2} P_2, L_{IF} = \frac{f_1^2}{f_1^2 - f_2^2} L_1 - \frac{f_2^2}{f_1^2 - f_2^2} L_2$$

In the formula (9), the parameter $\rho_0$ represents the distance between the satellite and the ground. The satellite coordinate is calculated using the precise ephemeris which is obtained in real time. The satellite clock offset dt is calculated using the precise clock offset.

The atmospheric delay correction which is obtained via interpolation is used to correct the un-differential carrier phase observations in the following formula.

$$\tilde{L}_i^k = L_i^k + \hat{v}_u \tag{10}$$

In the formula (10), $L_i^k$ represents the original carrier phase observation, and $\hat{v}_u$ represents the un-differential correction (which includes the phase fraction of the satellite) of the client end.

Then, the carrier phase observations corrected by using the atmospheric error are used to generate the inter-satellite single differential WM observations so as to eliminate the hardware delay of the receiver and the reference deviation of the phase fraction of the satellite, and the inter-satellite single difference wide-lane ambiguity $\Delta N_w^{i,j}$ is solved. Due to the influences of other factors such as the unmodeled error and the noise, the Kalman filter method or the multi-epoch smoothing method is used to increase the convergence rate of $\Delta N_w^{i,j}$, and the fixed solution $\Delta \hat{N}_w^{i,j}$ is obtained.

Secondly, the ionosphere-free combination ambiguity of the PPP solution is converted into the narrow-lane ambiguity and is fixed according to the fixed wide-lane ambiguity.

The ionosphere-free combination fixed solution is calculated according to the fixed wide-lane ambiguity and the fixed narrow-lane ambiguity, and a final positioning result is obtained.

Searching of the ambiguity of whole cycles is executed via the Lambda searching method in the above algorithm.

By using the un-differential correction distributed processing system and method based on the receiver of reference station of GNSS and the positioning system or the like of the invention, the calculating tasks of the load calculating server in the prior art are transferred to the receiver of the reference station, and a series of computing and processing tasks of the conventional PPP calculation, the PPP un-differential ambiguity fixing and the un-differential correction product generating or the like are realized by the receiver of the reference station, thus realizing load equalization and transfer of the load calculating server in a conventional mode. As such, on one hand, the performance requirement of the load calculating server is reduced, the load of the load calculating server is greatly reduced, and the problem of overload on existing load calculating servers is solved; meanwhile, a machine room of data processing servers that needs specially-assigned person on duty is dispended with, thus saving the cost and reducing user's maintenance work on the data processing servers. On the other hand, precise geographic coordinates of the reference stations and client end are no longer required to be acquired by the load calculating server; instead, the reference station sends the un-differential corrections (precise geographic coordinates are no longer required) to the area client end. Such an advantage enables servers to be shared by reference stations and area client end between different organizations, and at the same time avoids leakage of key information, thus exhibiting a better safety The receiver of the reference station realizes a series of computing and processing tasks generated by the un-differential PPP ambiguity fixing calculation and the un-differential correction based on a current embedded operating system frame, which can sufficiently satisfy relevant task requirements. The amount of calculation of using a server list and area positioning and matching algorithm is not high for the user, and a normal user's receiver can meet using requirements through a modification and development of handbook or firmware.

While the invention has been described in the specification with reference to particular embodiments thereof, it is apparent that various modifications and variations can be also made without departing from the spirit and scope of the invention. Therefore, the description and accompanying drawings should be considered as illustrative rather than limiting.

What is claimed is:

1. An un-differential correction distributed processing system, comprising:

a precise orbit clock offset server configured to provide each of a plurality of area reference stations of a global navigation satellite system (GNSS) with a precise ephemeris;

a reference station area code address server configured to provide a client end with a reference station area code address list for matching the client end to nearest area reference stations forming a triangle from the plurality of area reference stations; and a phase fraction estimating server configured to calculate a corresponding phase fraction part according to an un-differential real ambiguity calculated by a certain one of the plurality of area reference stations and send the corresponding phase fraction part to a receiver of the certain one of the plurality of area reference stations;

wherein the un-differential correction distributed processing system is configured to, through receivers of the plurality of area reference stations, perform the calculation of the un-differential real ambiguity, perform an un-differential ambiguity fixing calculation according to the corresponding phase fraction part, perform a calculation of a real-time un-differential correction of a satellite according to the precise ephemeris and the phase fraction part, and data interaction with the client end for providing the real-time un-differential correction to the client end.

2. The un-differential correction distributed processing system according to claim 1, wherein the precise orbit clock offset server is a precise orbit clock offset distributor, or a server configured by a user for estimating a precise orbit and clock offset data, or a server for providing a precise orbit and clock offset data.

3. The un-differential correction distributed processing system according to claim 2, wherein data of the precise orbit clock offset distributor originates from the server configured by the user for estimating a precise orbit and clock offset data, or the server for providing a precise orbit and clock offset data.

4. An un-differential correction distributed processing method, comprising: performing a calculation of un-differential real ambiguity, an un-differential ambiguity fixing calculation, a calculation of real-time un-differential correction of each satellite, and data interaction with a client end in receivers of a plurality of area reference stations of a global navigation satellite system (GNSS), wherein, the method further comprises:

(41) performing information interaction between a precise orbit clock offset server and the area reference stations, which comprises sending a real-time precise ephemeris to the area reference stations by the precise orbit clock offset server;

(42) performing information interaction between a phase fraction estimating server and the area reference stations, which comprises sending a calculated un-differential real ambiguity back to the phase fraction estimating server by the area reference stations, calculating a phase fraction part by the phase fraction estimating server according to the un-differential real ambiguity, and sending the phase fraction part to the area reference stations;

(43) performing information interaction between a reference station area code address server and the client end, which comprises visiting the reference station area code address server by the client end so as to obtain a reference station area code address list matching nearest area reference stations forming a triangle from the plurality of area reference stations by use of the reference station area code address list; and

(44) performing information interaction between the area reference stations and the client end, which comprises connecting the client end to the nearest reference stations forming the triangle so as to obtain a real-time precise orbit, a clock offset and the real-time un-differential correction, and performing a precise point positioning-real time kinematic (PPP-RTK) calculation by the client end;

wherein the step of performing information interaction between the phase fraction estimating server and the one area reference station further comprises:

(42.1) calculating the un-differential real ambiguity by some or all of the area reference stations according to observation data of the area reference stations themselves, and sending the un-differential real ambiguity to the phase fraction estimating server;

(42.2) obtaining the phase fraction part of each satellite by the phase fraction estimating server according to the un-differential real ambiguity, and sending the phase fraction parts to receivers of all of the area reference stations;

(42.3) performing a precise point positioning (PPP) un-differential ambiguity fixing calculation independently in the receivers of the area reference stations according to the phase fraction parts;

(42.4) calculating the real-time un-differential correction of each satellite in the receivers of the area reference stations according to the precise ephemeris and the phase fraction part after a PPP un-differential ambiguity of the area reference stations is fixed; and (42.5) storing the real-time un-differential correction of each satellite in a cache of the receiver of the area reference stations by the area reference stations.

5. The un-differential correction distributed processing method according to claim 4, wherein the step of (42.2) further comprises:

(42.2.1) eliminating the influences of measurement noise and multi-path of the un-differential real ambiguity by the phase fraction estimating server so as to determine whether the un-differential real ambiguity is valid;

(42.2.2) removing the un-differential real ambiguity if the un-differential real ambiguity is invalid; and (42.2.3) obtaining the phase fraction part of the satellite corresponding to the un-differential real ambiguity via an inter-satellite single-difference method, if the un-differential real ambiguity is valid.

6. The un-differential correction distributed processing method according to claim 4, wherein the step of (42.3) further comprises:

(42.3.1) obtaining the phase fraction part and the real-time precise ephemeris by the area reference stations and fixing the un-differential real ambiguity independently in the receivers of the reference stations according to the phase fraction part and the real-time precise ephemeris;

(42.3.2) determining whether the satellite satisfies the validity requirement by the area reference stations;

(42.3.3) calculating the real-time un-differential correction of each satellite and storing the real-time un-differential correction in the receivers of the area reference stations, if the satellite satisfies the validity requirement; and (42.3.4) ignoring the satellite if the satellite does not satisfy the validity requirement.

7. The un-differential correction distributed processing method according to claim 4, wherein the step of performing information interaction between the area reference stations and the client end further comprises:

(44.1) visiting the reference station area code address server by the client end so as to obtain the reference station area code address list to match the nearest reference stations forming the triangle;

(44.2) connecting the client end to the nearest reference stations forming the triangle and obtaining the real-time un-differential correction stored in the cache of the receiver of the nearest reference stations forming the triangle;

(44.3) generating a virtual un-differential correction by the client end according to the real-time precise orbit, the clock offset and the un-differential correction obtained from the nearest reference stations forming the triangle; and (44.4) performing the PPP-RTK positioning calculation by the client end according to the virtual un-differential correction and the real-time precise ephemeris sent by the precise orbit clock offset server so as to achieve centimeter level precise positioning in real time.

8. The un-differential correction distributed processing method according to claim 7, wherein the step of (44.1) further comprises:

(44.1.1) obtaining approximate position information of a user by the client end;

(44.1.2) determining whether the client end is in a triangle area formed by any three area reference stations by the client end according to a triangulation algorithm;

(44.1.3) obtaining augmentation information service parameters stored separately in the receivers of the three area reference stations by the client end, if the client end is in the triangle area formed by the any three area reference stations; and (44.1.4) searching for a triangle which has the shortest distance from the center of the client end, if the client end is not in the triangle area formed by the any three reference stations.

9. The un-differential correction distributed processing method according to claim 7, wherein the step of (44.3) is performing linear interpolation on the real-time un-differential correction by the client end so as to generate the virtual un-differential correction.

10. A real-time un-differential correction generating system, comprising:

a plurality of area reference stations of a global navigation satellite system (GNSS);

a precise orbit clock offset server configured to provide each of the plurality of area reference stations with a precise ephemeris; and a phase fraction estimating server configured to calculate a corresponding phase fraction part according an un-differential real ambiguity calculated by a certain one of the plurality of area reference stations the un-differential real ambiguity and send the corresponding phase fraction part to the receiver of the certain one of the plurality of area reference stations;

wherein each of the area reference stations is configured to perform calculation of the un-differential real ambiguity according to its own observation data, and to perform calculation of real-time un-differential correction of a satellite according to the precise ephemeris and the phase fraction part.

\* \* \* \* \*